United States Patent
Trifonov et al.

(10) Patent No.: US 8,144,980 B2
(45) Date of Patent: Mar. 27, 2012

(54) METHOD AND APPARATUS FOR SELECTING AN OBJECT IN AN IMAGE

(75) Inventors: Mikhail Ivanovich Trifonov, Saint Petersburg (RU); Olga Vadimovna Sharonova, Saint Petersburg (RU)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 12/942,258

(22) Filed: Nov. 9, 2010

(65) Prior Publication Data
US 2011/0058748 A1 Mar. 10, 2011

(51) Int. Cl.
*G06K 9/00* (2006.01)
*G06K 9/48* (2006.01)
(52) U.S. Cl. ........................ 382/164; 382/199
(58) Field of Classification Search .......... 382/162–164, 382/171, 173, 176, 181, 190, 199, 225; 358/537; 345/589
See application file for complete search history.

(56) References Cited

U.S. PATENT DOCUMENTS

| | | | |
|---|---|---|---|
| 5,999,651 A * | 12/1999 | Chang et al. | 382/215 |
| 6,434,269 B1 * | 8/2002 | Hamburg | 382/163 |
| 6,480,615 B1 * | 11/2002 | Sun et al. | 382/103 |
| 7,164,718 B2 * | 1/2007 | Maziere et al. | 375/240.16 |
| 2005/0073529 A1 * | 4/2005 | Gu | 345/589 |
| 2005/0180659 A1 * | 8/2005 | Zaklika et al. | 382/171 |

OTHER PUBLICATIONS

Xu et al. ("Snakes, Shape, and Gradient Vector Flow" IEEE Transactions on Image Processing, vol. 7, No. 3, Published on Mar. 1998, pp. 359-369).*
Gao et al. ("Interactive Color Image Segmentation Editor Driven by Active Contour Model," IEEE International Conference on Image Processing, Published on 1999, pp. 245-249).*

* cited by examiner

*Primary Examiner* — Duy M Dang
(74) *Attorney, Agent, or Firm* — Patterson & Sheridan LLP

(57) ABSTRACT

A boundary in an image is identified by identifying a search region within the image. The process continues by determining image gradients in the search region and determining multiple color regions within the search region. An active contour representing the boundary is created based on the image gradients and the multiple color regions.

20 Claims, 8 Drawing Sheets

METHOD AND APPARATUS FOR SELECTING AN OBJECT IN AN IMAGE

CROSS-REFERENCE TO RELATED APPLICATIONS

This patent application claims the benefit of U.S. patent application Ser. No. 10/886,937 entitled "Method and Apparatus for Selecting an Object in an Image" filed Jul. 8, 2004, now U.S. Pat. No. 7,840,074, and U.S. Provisional Application No. 60/545,653, filed Feb. 17, 2004, the disclosures of which are incorporated herein by reference.

FIELD OF THE INVENTION

This systems and methods described herein relate to image editing and, more particularly to selecting an object in an image.

BACKGROUND OF THE INVENTION

Defining an object in an image is a common task in digital image editing. Generally, this task is referred to as selecting an object. There are a variety of reasons for selecting an object in an image. For example, a user may desire to copy the object elsewhere or to composite the object with another image in order to create a new image. Selecting an object also has the effect of restricting an image editing action to the selected region. Thus a tool or filter may be applied to the selected region to modify it in some way without altering the rest of the image. Selecting objects in images is, therefore, a common and frequently performed task.

Accordingly, digital image editors contain various tools for making selections of one or more objects. For example, a selection may be made in the form of straight line segments joining click points made by a user along an object boundary, as for instance with the Point to Point Selection tool in JASC® Paint Shop™ Pro®" (available through JASC Software®, Inc., Eden Prairie, Minn.). While it is quick to use, the disadvantage of this tool is that the straight segments may not accurately conform to the borders of the object. Alternatively, a selection may be traced along a boundary of an object, such as with the Freehand Selection tool of Paint Shop Pro. However, this boundary tracing can be a tedious and time-consuming task for objects with complex boundaries.

A variant of this technique is to trace the border of an object with a spline based curve such as is provided by the Pen tool of Paint Shop Pro. This technique has the advantage that any tracing errors may be corrected after the fact by editing the curve. However, this editing is itself time-consuming and requires some understanding on the part of the user.

Objects may also be selected according to color similarity, for instance by using the Magic Wand tool of Paint Shop Pro. This technique, however, is more appropriate to simple graphics than to photographed objects, which may contain a multiplicity of colors including some colors that are present in non-object areas.

Yet another alternative involves painting a selection onto an image, for example using the Edit Selection mode of Paint Shop Pro. While convenient in many cases, this method may be slow for complex objects and may require frequent changes in brush size to conform to the size of object features.

A growing group of digital camera purchasers are encountering digital image editing for the first time. As novices, they do not have the practiced facility with selection tools possessed by experts. There is, therefore, the need for new selection tools that provide a combination of speed and ease of use on the one hand and accuracy in delineating objects on the other, with which even a non-expert can achieve good results.

Consumer digital photographs can pose particular problems for selection tools since the consumer may not be a skilled photographer. Images are often of everyday scenes containing cluttered backgrounds and poorly lit subjects. Frequently, edges of objects in the scene are not well defined, such that decisions about the true boundary location of an object are hard to make. Consequently it is desirable that a new selection tool should not be dependent solely on image gradients for defining the boundary of an object but should also use other image information.

While it advantageous for any new selection tool to automate as much of the selection process as possible to assist the user, the tool should also offer sufficient flexibility to allow the selection to be placed exactly where desired. Excessive automation can be a drawback since incorrect placement of a selection can frustrate the user. This is especially true in the case of cluttered scenes, where only a human with understanding of the scene can determine the correct object or objects of interest by using knowledge about the shapes of real-world objects that is not encoded in the image. Various systems and methods described herein provide, among other things, a selection tool that meets these criteria.

DETAILED DESCRIPTION

Figure 1:
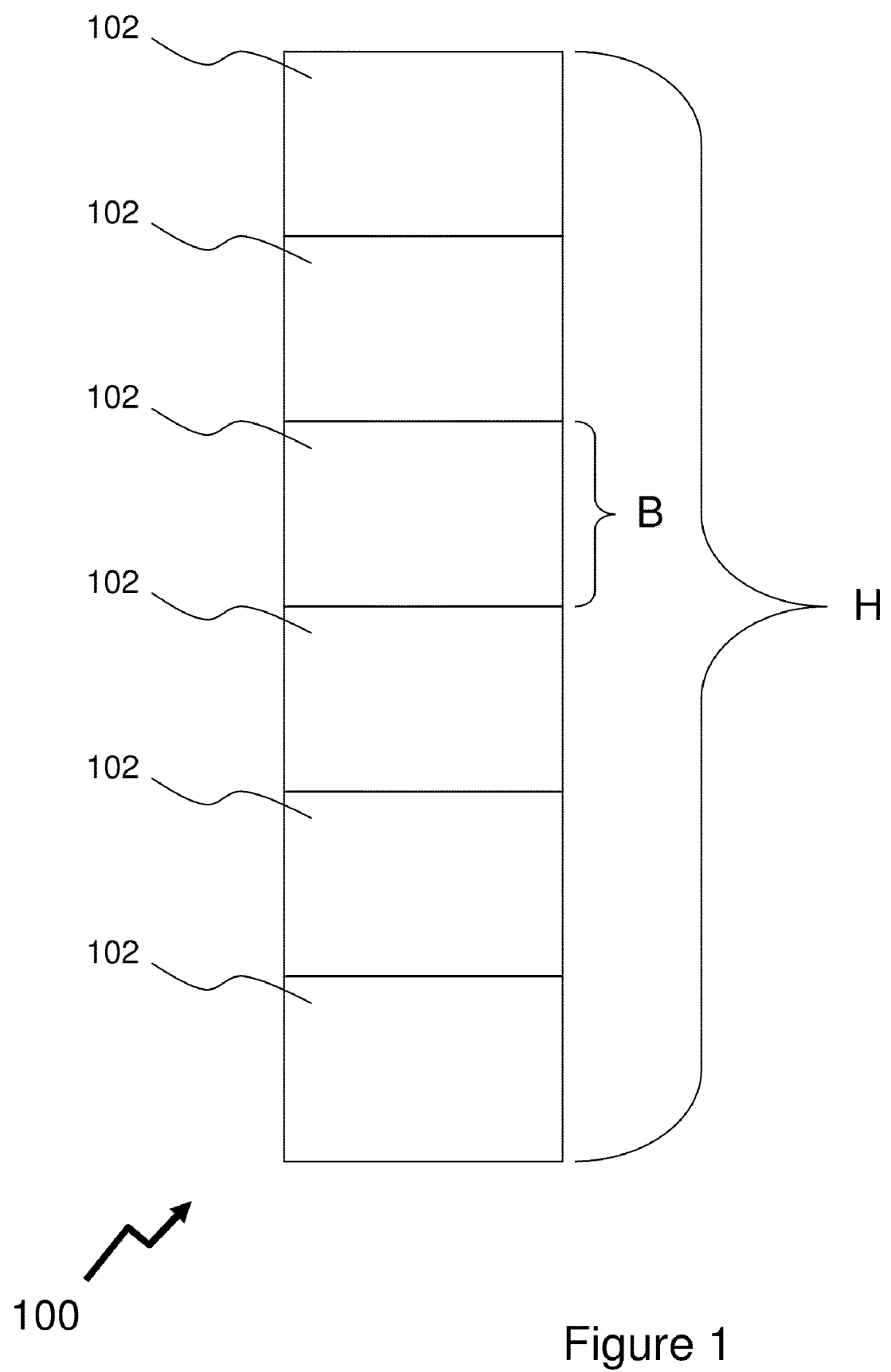
FIG. 1 illustrates multiple color regions associated with an example search region.

The systems and methods discussed herein relate to a selection tool that determines an optimal (or a best) object boundary location in an image between two points placed on the boundary. Determining such a boundary includes, for example, defining a search region (also referred to as a "search area"), determining image gradients in the search region, determining color regions within the search region by Fisher linear discriminant analysis, constructing an active contour responsive to forces derived from the aforementioned gradient and color region information, and minimizing the energy of the active contour to derive an optimal (or best) contour.

Additional implementations described herein may include detection of image gradients at multiple scales, the use of iterative Fisher linear discriminant analysis, and the selection of an optimal active contour from a set of competing active contours. Optionally, the implementations described herein may include the ability to smooth the boundary represented by the optimal contour.

Various systems and methods described herein employ active contours, which are also referred to as "snakes". Snakes are curves that evolve under the influence of forces. Usually these forces comprise an internal and an external force. The internal forces may represent properties such as tension and stiffness. Tension causes the snake to contract its overall size and stiffness limits the maximum curvature of the snake. These internal forces are counteracted by external forces representing an attraction to image features. These features may be local, such as the gradient of the image at a pixel, or the features may have a more global representation, such as a region boundary. The competition between the internal forces and the external forces causes the snake to evolve to a position in the image that defines an object of interest. There may also be additional conditions that govern the motion of the snake.

As described herein, a selection tool is used to place successive points on the boundary of an object of interest within an image. These points may be placed, for example, with a conventional pointing tool such as a mouse, light pen, trackball, or graphic tablet. The selection tool determines an optimal connecting curve between the points to complete the selection outline. The points may be placed at a location specified by the user or they may be placed automatically, for example at the closest edge in the image within some search distance of the user-supplied points. In accordance with one implementation, the points are placed at the location supplied by the user to maximize the user's control of the selection result. The points may be placed first and then joined by curves or the curve may be created as each new point is added. In general, the latter may be more effective since the intermediate selection result is visible and the user can correct any point placement errors as they happen.

Once at least two points have been established on the boundary of the object of interest, a search region can be defined. In one implementation, the search region is confined to the image region between the points and to be symmetrically disposed about a straight line joining the two points and to be symmetrical about its bisector.

The search region may have a variety of shapes, for example an ellipse with the major axis along the line joining the points. However, a rectangle offers certain conveniences. Such a rectangle may be defined by a constant aspect ratio, such that its width changes with the length defined by the distance between the two points. Alternatively, the rectangle may have a fixed width independent of the distance between the points. In one embodiment of the invention, this fixed width may be controlled by the user within some limits. In general, a fixed width is satisfactory, though better results may be achieved by narrowing the width as the user-supplied points approach each other closely. In one implementation, a useful width of the search region is from about 5 pixels to about 250 pixels. In a particular embodiment, the search region is from about 5 to about 50 pixels. In other implementations, any search region width can be utilized. Optionally, the search region may be drawn on the image as a guide for the user, though it is preferred to omit this to avoid distracting clutter.

One convenience of a rectangular search region is that it provides a well defined region that can be rotated. If the vector connecting the user-supplied points is rotated to align with a vertical coordinate, the search for the boundary becomes one dimensional. In other words, the snake control points (snaxels) of the snake or snakes evolve only along the horizontal direction. This simplifies the representation of the snake and reduces the computational burden, leading to a more responsive tool. Once the segment of object boundary in the search region is determined, it can be rotated back into alignment with the image. Optionally, the rotations may be carried out with sub-pixel resolution.

Once a search region is defined and, in one embodiment, oriented to create a one-dimensional snake, image gradients and color regions are determined. Any convenient color space may be used, for example RGB (Red-Green-Blue) or CMYK (Cyan-Magenta-Yellow-black), or color spaces of an opponent character such as YIQ or CIELAB. Color regions may be defined as illustrated in FIG. 1, with reference to an exemplary rectangular search region.

As used in FIG. 1, the dimension H represents the Euclidean distance between two user-supplied points. The dimension W represents the width of a search region 100, as discussed above. The search region 100 may be divided into a series of sub-regions 102, each having a height B. In the example of FIG. 1, search region 100 is divided into six sub-regions 102. The number of sub-regions 102 in a particular search region 100 can be determined in a wide variety of ways. For example, dimension B may be chosen such that an integer number of sub-regions 102 fill the search region 100 with B as close in magnitude to W as is consistent with an integer number of sub-regions 102. Alternatively, the height of the sub-region 102, B, may be set in some fixed ratio to the width, W, if necessary leaving a partial sub-region completing the search region 100 at one end. The ratio B:W may, for instance, be chosen as unity. Once sub-regions are established according to a chosen procedure, the colors in the search region are analyzed as shown in FIG. 2.

Figure 2:
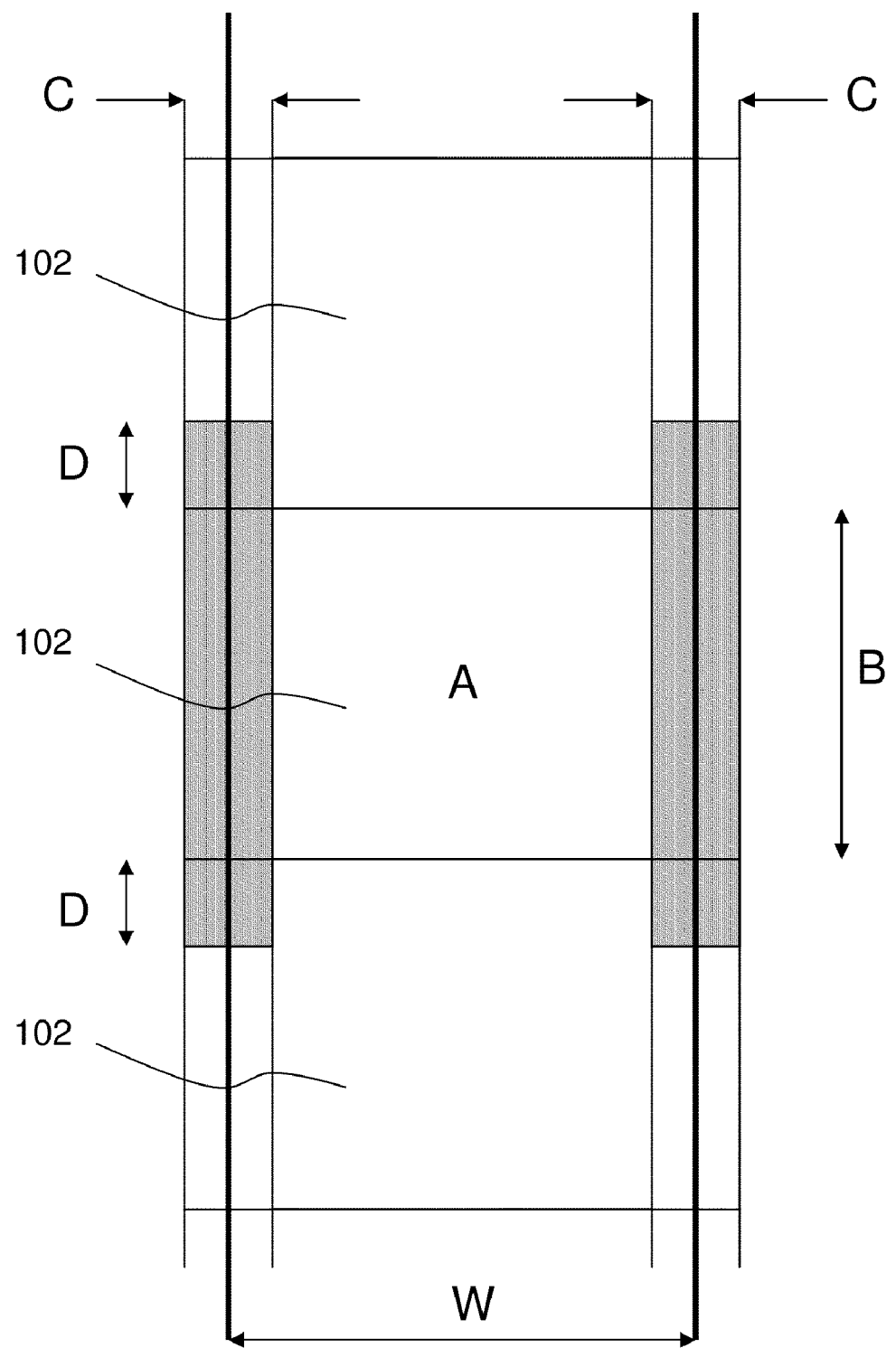
FIG. 2 illustrates multiple color regions and associated strips that are analyzed as part of a search region.

In FIG. 2, region "A" represents one of the sub-regions 102 of FIG. 1, which serve as the basis for color analysis. Dimension W is again the width of the search region 100. Strips C are defined at the boundaries of the search region 100. The dimension and shape of these strips may be chosen within wide limits depending on the shape of the search region. For example, the strips may be placed immediately inside the search region, immediately outside the search region, or straddling the boundary of the search region, as shown in FIG. 2. The width of the strips may vary, for example, in proportion to the width of the search region within some limits. Alternatively, the width of the strips may be fixed at some suitable value on the order of at least several pixels. In one implementation, a suitable range for the width of the strips is from about 2 to about 10 pixels, with lower values generally providing better results. In other implementations, the strips may have any width.

The boundary between the object of interest and the remainder of the image is presumed to lie inside the search region 100 and the boundary defines left and right regions, which in general differ in color. Thus, the strip on the left of sub-region A may be considered to contain a training set of colors for one region and the strip on the right to contain the training set of colors for the other region. These training sets may be taken from strips C solely within sub-region A. Alternatively, the training samples may be overlapped with adjacent sub-regions, as shown by the overlap region D, which overlaps into both adjacent sub-regions. This generally results in a smoother and more consistent boundary contour. The size of this overlap region D may be from about zero to about B, with a particular embodiment using a value of about 0.5B. The pixels in the sub-region are then classified on the basis of the training examples to determine a probability that the pixel belongs to a given class. This class may be chosen arbitrarily as either that represented by the left training set—referred to as Class L—or the right training set—referred to as Class R. This classification may be done, for example, by conventional Fisher discriminant analysis or by the iterative Fisher discriminant analysis method of co-pending provisional application Ser. No. 60/545,652, filed Feb. 17, 2004, entitled "Iterative Fisher Linear Discriminant Analysis", by Mikhail Ivanovich Trifonov and Leonid Borisovich Lalyko, the disclosure of which is incorporated herein by reference.

This classification results in every pixel within the sub-region being assigned a probability of belonging to a given class. The remaining sub-regions of the search region are processed similarly, using their respective training sets, so that every pixel in the search region has a probability of belonging to a given class. Optionally, the probabilities at pixels in the search region may be subjected to filtering, for example, to suppress the effect of image noise. Suitable filters include ones such as an averaging filter or a median filter.

Finally, an error function is computed that is subsequently used to provide an image energy acting on a snake. The error function is based on the previously calculated probabilities and the assumption that there is a single boundary between the Class L and the Class R regions. The calculation is conducted along rows across the search region. An example error function for is given by:

$$ErrFish_{ij} = \frac{1}{W}\left[\sum_{\substack{k<j \\ p_{ik}<0.5}} (1-p_{ik}) + \sum_{\substack{k>j \\ p_{ik}\geq 0.5}} (p_{ik})\right] \quad (1)$$

where W is a normalization factor.

Assume that $p_{ik}$ was chosen to represent the probability of belonging to Class L. At each pixel position j along row i the $ErrFish_{ij}$ value is computed. The first summation above has the following meaning. If a pixel to the left of pixel j was classified as belonging to Class R by virtue of having a Class L probability less than 0.5, then the classification error for that pixel is $(1-p_{ik})$. Similarly, the second summation has this meaning: of a pixel to the right of j was classified as belonging to Class L rather than Class R by virtue of having a Class L probability of 0.5 or more, then the classification error for that pixel is $p_{ik}$. The error function may equivalently be expressed in terms of the probability, $p_{ik}$, of membership in Class R, whereupon it has the form:

$$ErrFish_{ij} = \frac{1}{W}\left[\sum_{\substack{k<j \\ p_{ik}<0.5}} (p_{ik}) + \sum_{\substack{k>j \\ p_{ik}\geq 0.5}} (1-p_{ik})\right] \quad (2)$$

Other methods of deriving the region force may used. For example, the following is an example of an alternative suitable form:

$$ErrFish_{ij} = \frac{1}{W}\left[\sum_{\substack{k<j \\ p_{ik}<0.5}} (0.5-p_{ik}) + \sum_{\substack{k>j \\ p_{ik}\geq 0.5}} (p_{ik}-0.5)\right] \quad (3)$$

In this equation, the left hand term represents the error due to Class L pixels being classified as Class R, while the right hand term represents the error due to Class R pixels being classified as Class L.

The function representing a region energy acting on the snake may be computed from single pixel rows as described. However, in one implementation, a given row is used along with one or more rows above it and below it, since this can give smoother contours. In such a case, at each pixel position j an average is formed from a column of pixels above the row and below the row. The number of rows considered along with any given row may be from about one to about 20. In one implementation, the number of rows considered along with any given row may be from about 6 to about 10.

Along with the calculation of color regions, image gradients are estimated. Image gradients may be estimated at a single spatial scale or, preferably, at more than one spatial scale. When multiple spatial scales are used, it is preferred to evolve a snake at a first spatial scale, compute the next scale, evolve the snake gain, and so on. In one implementation, this is done using a coarse-to-fine scheme to increase the likelihood of the snake converging to a global minimum.

The number of discrete scales used may be chosen within wide limits. For example, in one implementation, the number of discrete scales used are from about two to about five. It may be useful to limit the number of scales as the width W of the search region decreases. Increasingly coarse scales may be established by progressively more severe blurring of the image, for example with a Gaussian filter or may be intrinsic to the edge finding filter as in the case of Canny edge detection. Other edge detectors may also be used, such as the Roberts, Prewitt or Sobel operators, with the last being preferred.

The edge may be found as vector edges of the color channels, e.g., as the largest difference between eigenvalues in the tensor metric or it may be determined from a single channel derived from the color channels, such as a grayscale or lightness channel. The snake may be allowed to evolve according to edge strength, i.e., along the gradient of edge responses. However, in one implementation, edges are localized using non-maximum suppression. The result of non-maximum suppression is binarized against a low threshold. This procedure allows the snake to find weak edges near to strong ones, for instance.

The search region now contains pixels marked as edge members and pixels marked as not belonging to an edge. From this point, a field may be constructed to provide an edge driving energy for the snake, referred to as "EdgeMap", by computing a distance map from every pixel to an image edge. One example procedure for forming a distance map uses a wavefront propagation or diffusion principle. Thus, initially a "0" label is assigned to any edge pixel. Edge pixels create waves propagating in four directions (left, right, up, down) and at each propagation step non-edge unlabeled pixels are labelled. At the first step, pixels adjacent to an edge receive the label "1". At the second step pixels adjacent to a labelled pixel get the label "2", and so on until all pixels in the search region have received a label corresponding to their distance from the nearest edge. When multiple scales are used for edges, a distance map is derived at each scale so that EdgeMap is a function of scale, i.e., EdgeMap(Scale).

Evolution of the snake is governed by external forces due to the image and to internal forces describing the curve parameterization. The image is represented as a potential energy field. For a one-dimensional snake, the image energy for row i at a position xi along the row is given by:

$$E_{image}(i,x_i) = \alpha ErrFish(i,x_i) + \beta EdgeMap(i,x_i,Scale) \quad (4)$$

where $\alpha$ and $\beta$ are empirical weighting parameters that adjust the relative importance of region and edge information. The force acting on the snake is then given by the energy gradient $\delta E_{image}(i,x_i)/\delta x_i$.

The internal forces acting on the snake may be represented in any conventional way, for example by means of a first elasticity term and a second stiffness term. For a one-dimensional snake the internal force is given by:

$$F_{int}(i, x_i) = \delta \cdot \frac{dx_i}{dx} + \gamma \cdot \frac{d^2 x_i}{dx^2} \quad (5)$$

where $\gamma$ and $\delta$ are empirical parameters adjusting the importance of elasticity and stiffness relative to each other and to the image force.

The evolution of a snake may take place in a conventional way as described in the previously mentioned literature references, such that a new position of a snaxel (i.e., snake control point) relative to the previous position is given by:

$$x_i \leftarrow x_i - \frac{\delta E_{image}(i, x_i)}{\partial x} + F_{int}(i, x_i) \quad (6)$$

Evolution is continued until the snake converges on a minimum energy position. When a snake is evolved iteratively in coarse-to-fine fashion using edge distance maps at multiple scales, the initial position of the snake is the minimum energy position obtained from the previous, coarser, scale.

The empirical weighting coefficients $\alpha$, $\beta$, $\gamma$, and $\delta$ usually lie in the interval between 0 to 1 and can be tuned to produce the performance required from the snake. Typical values may lie in the range from about 0.05 to about 0.5. When a snake is evolved iteratively in coarse-to-fine fashion, it may be beneficial to adjust the values of coefficients $\alpha$, $\beta$, $\gamma$, and $\delta$ at each scale by a small amount, for example by about 5% to about 50%, since the image energy acting on the snake can depend on scale. In one implementation, the weighting, $\beta$, for image edges is increased while the remaining coefficients are decreased as the scale diminishes.

The snake may also be implemented as a thinned snake. For example, instead of placing a snaxel in every pixel row of the search region, the snaxels may be placed at every nth row. Suitable values of n are from about 1 to about 5, with a particular embodiment using a value of 2 for n. Using a thinned snake can reduce the amount of calculation required and result in a more responsive tool.

The selection tool may use a single snake or, in other embodiments, it may use multiple snakes. When a single snake is used, it may be initialized in a variety of ways. For example, it may be placed along the line joining the two user-supplied points defining the search region or it may be initialized along the region boundary defined by analysis of colors in the search region. Additionally, random displacements from either of these positions may be employed.

Multiple snakes may be used with the aim of improving the likelihood of locating a global minimum in the search region. Each such snake has its own starting position and may be allowed to evolve independently of other snakes. The number of snakes may vary depending on need. On the one hand, using more snakes allows more extensive exploration of the search region and, on the other hand, the amount of computation is increased. A suitable number of snakes is from about two to about six, with a particular embodiment using about four snakes.

When initializing multiple snakes, it may be beneficial to place at least some of the snakes symmetrically about the line joining the user-supplied points in order not to bias the results. Additionally, it may be beneficial to place at least some of the snakes such that a large fraction of the search region can be explored by the snake. For example, snakes may be placed along the boundaries of the search region, preferably not including the pixels used to establish training sets for color classification. Alternatively, snakes may be placed tangential to the boundaries of the search region. Additional snakes may be placed along the line joining the two user-supplied points or along the region boundary defined by color analysis.

After convergence, the snake with the lowest overall energy is selected as defining the contour of the object of interest. When more than one snake has the same minimum energy after convergence, additional criteria may be employed. For example, the most straight snake may be chosen or the snake initialized along the line joining the user-supplied points may be selected.

Additionally, depending on the criteria chosen for the selection tool, the contour received from the optimal snake may be subjected to smoothing, for example by averaging contour coordinates. The smoothing may be done dynamically as user-supplied points are added or it may be performed after a complete closed contour defining an object boundary is achieved. The smoothing may be automatic or it may be determined by the setting of a control available to the user.

Figure 3:
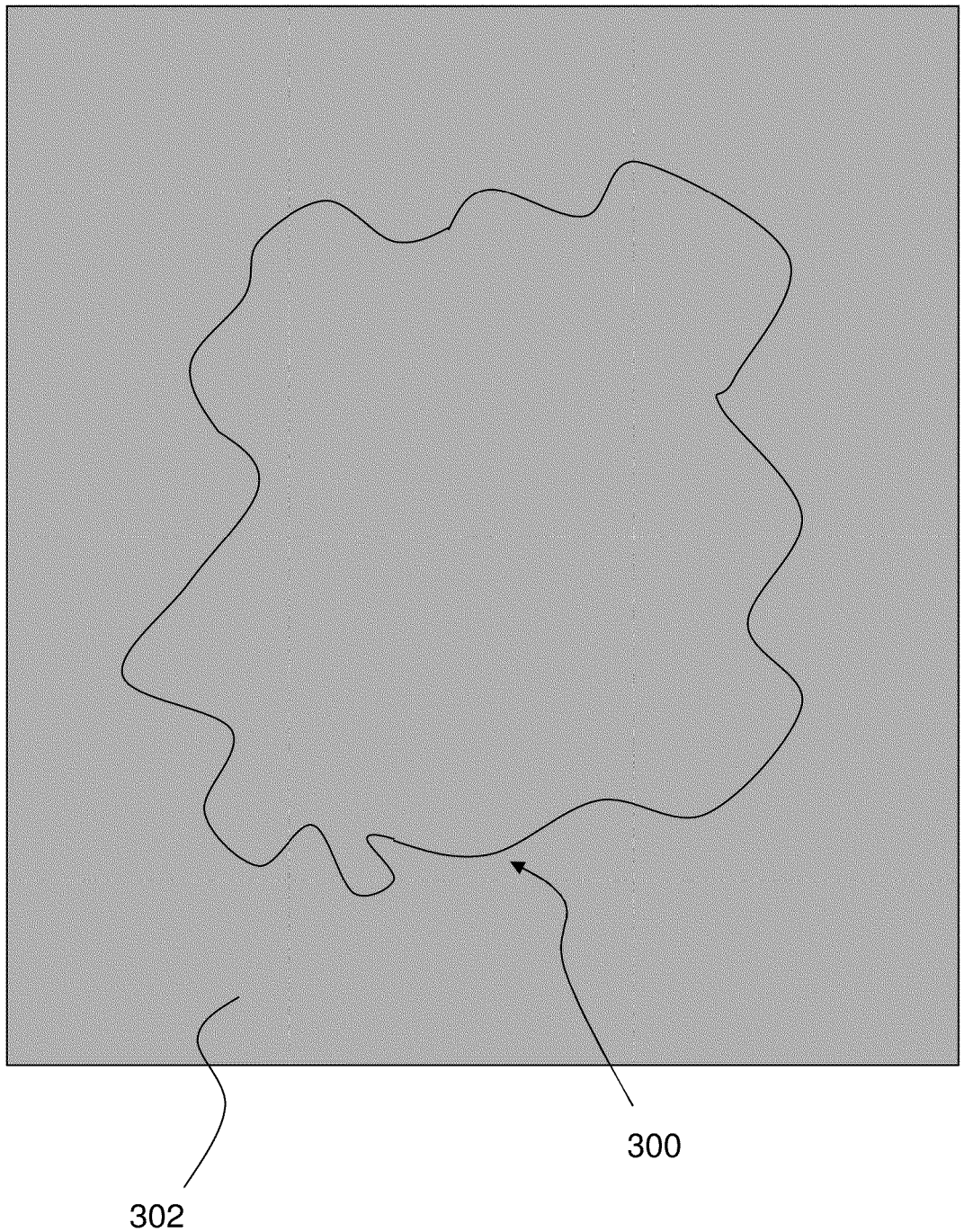
FIG. 3 illustrates an irregular object on a background of broadly similar color.

FIG. 3 illustrates an irregular object 300 on a background 302 of broadly similar color (or grayscale). At different places around its periphery the object 300 has a sharply defined boundary, a soft boundary, and a poorly defined boundary representing a gradual transition from object to surrounding background 302.

Figure 4:
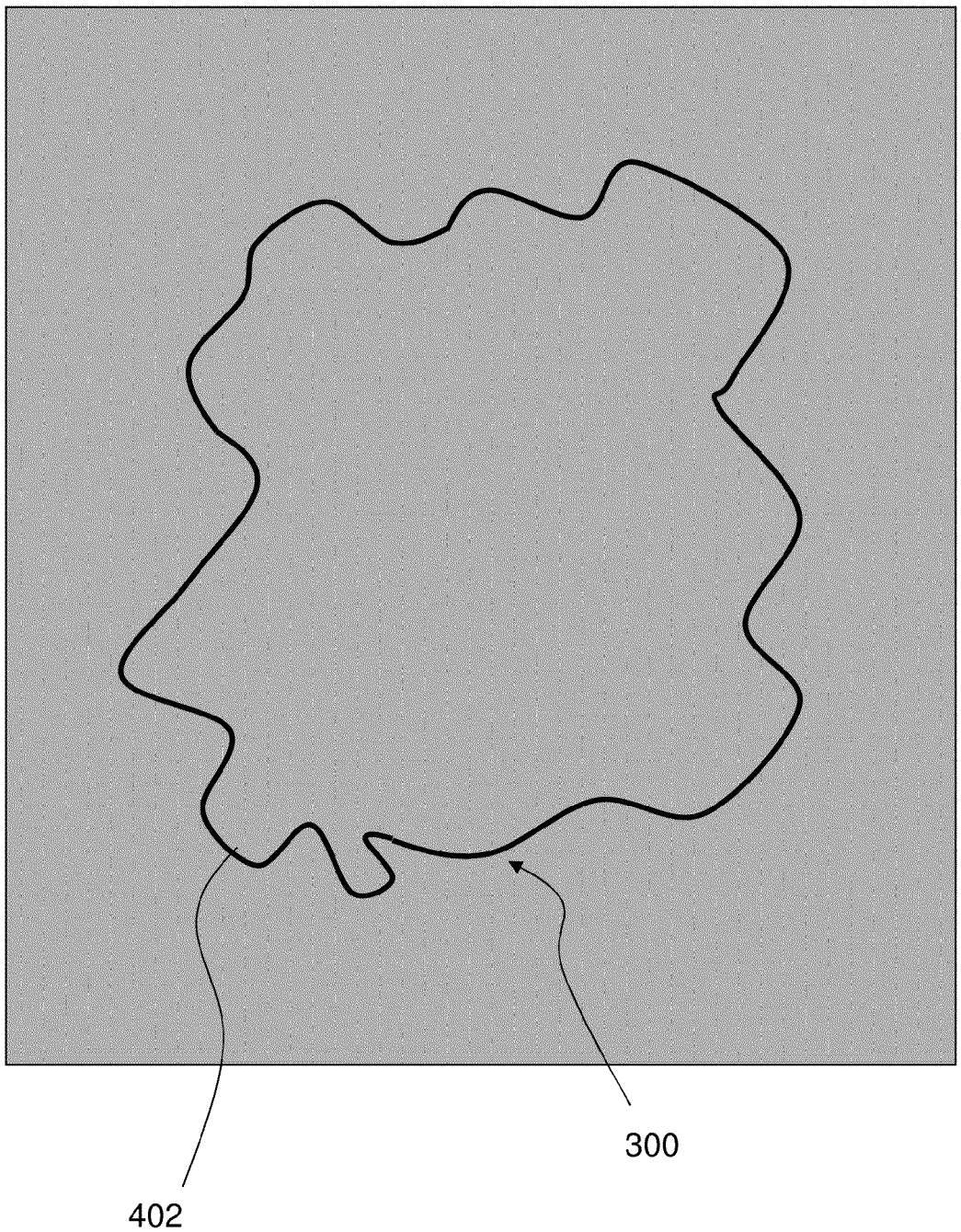
FIG. 4 illustrates the object of FIG. 3 with the object's boundary identified by a solid dark line.

FIG. 4 shows the same object 300 with the object's boundary identified by a solid dark line 402. The object boundary line 402 is generated by a selection tool using the systems and procedures discussed herein. As shown in FIG. 4, the object boundary line 402 contains both sharp and gradual boundary regions, producing a result similar to one that might be obtained by manually defining the location of the boundary at every pixel of the object's periphery.

Figure 5:
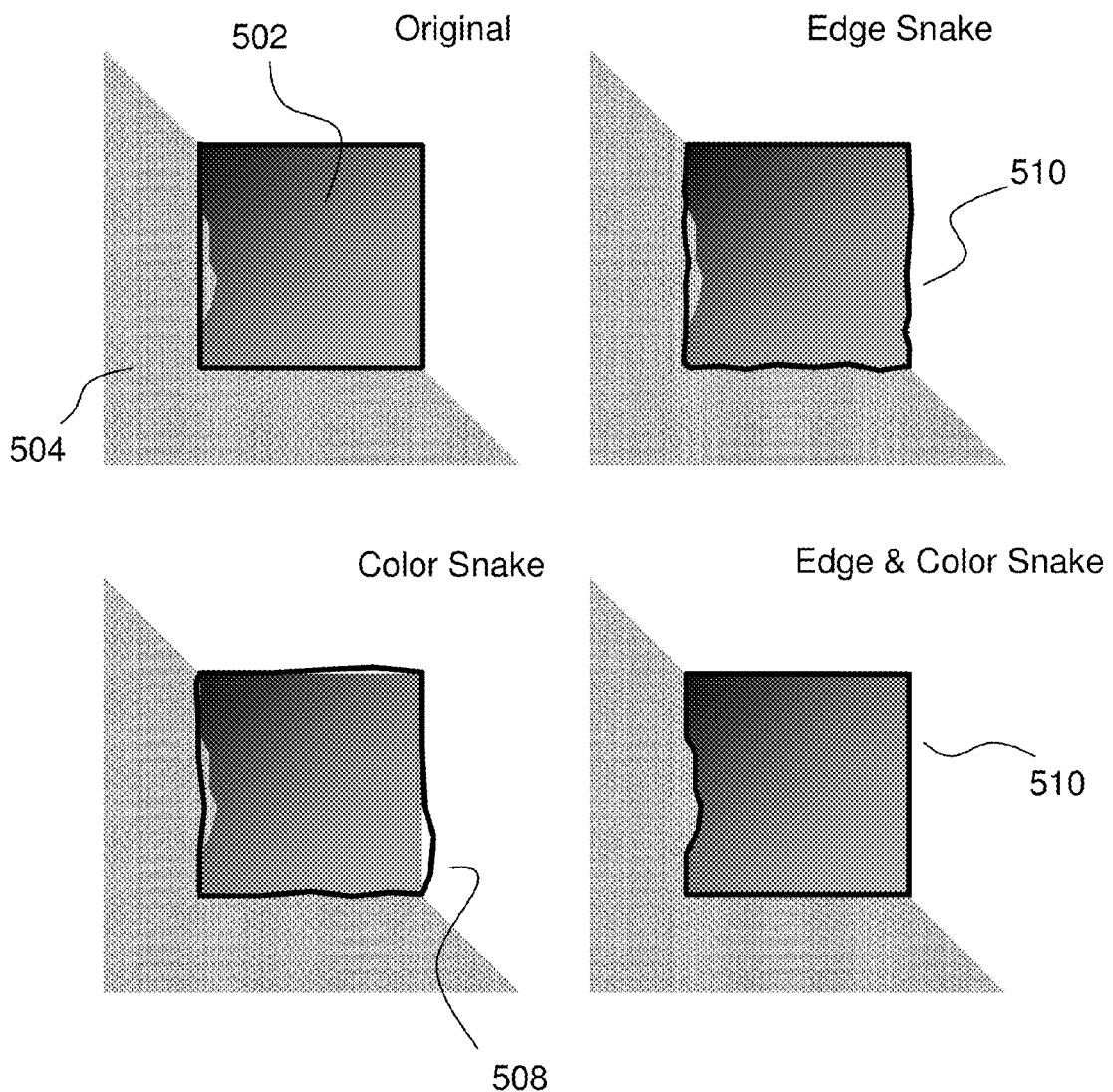
FIG. 5 illustrates various snakes (active contours) utilizing both edge and color information.

FIG. 5 illustrates snakes utilizing both edge and color information. At top left is the original image of an unevenly filled square 502 against a noisy background 504 containing extraneous edges. The square object 502 is selected by clicking on its four corners. The resulting selection is shown in black. At top right is the result of using a snake 506 based solely on edges, which has problems with the poorly defined edge at the bottom right of the square and which incorrectly detects a line in the background as the boundary of the square. At 1 bottom left, a snake 508 based only on color has some problems near the top right and bottom right corners of the square. However, the snake 510 using a combination of edge and color information produces a very satisfactory result, as shown at bottom right. The snake of the present invention exhibits a resistance to image noise compared to conventional edge-based snakes.

It will be appreciated that the various methods described herein may be implemented, all or in part, as one or more computer programs or modules that include computer-executable instructions and/or computer readable data. These computer programs may be stored or embodied in one or more types of computer-readable medium. As used herein, a computer-readable medium may be any available medium that can store and/or embody computer-executable instructions and that may be accessed by a computer or computing process. As used herein, a computer program product comprises a computer program or module embodied in or on a computer-readable medium.

Figure 6:
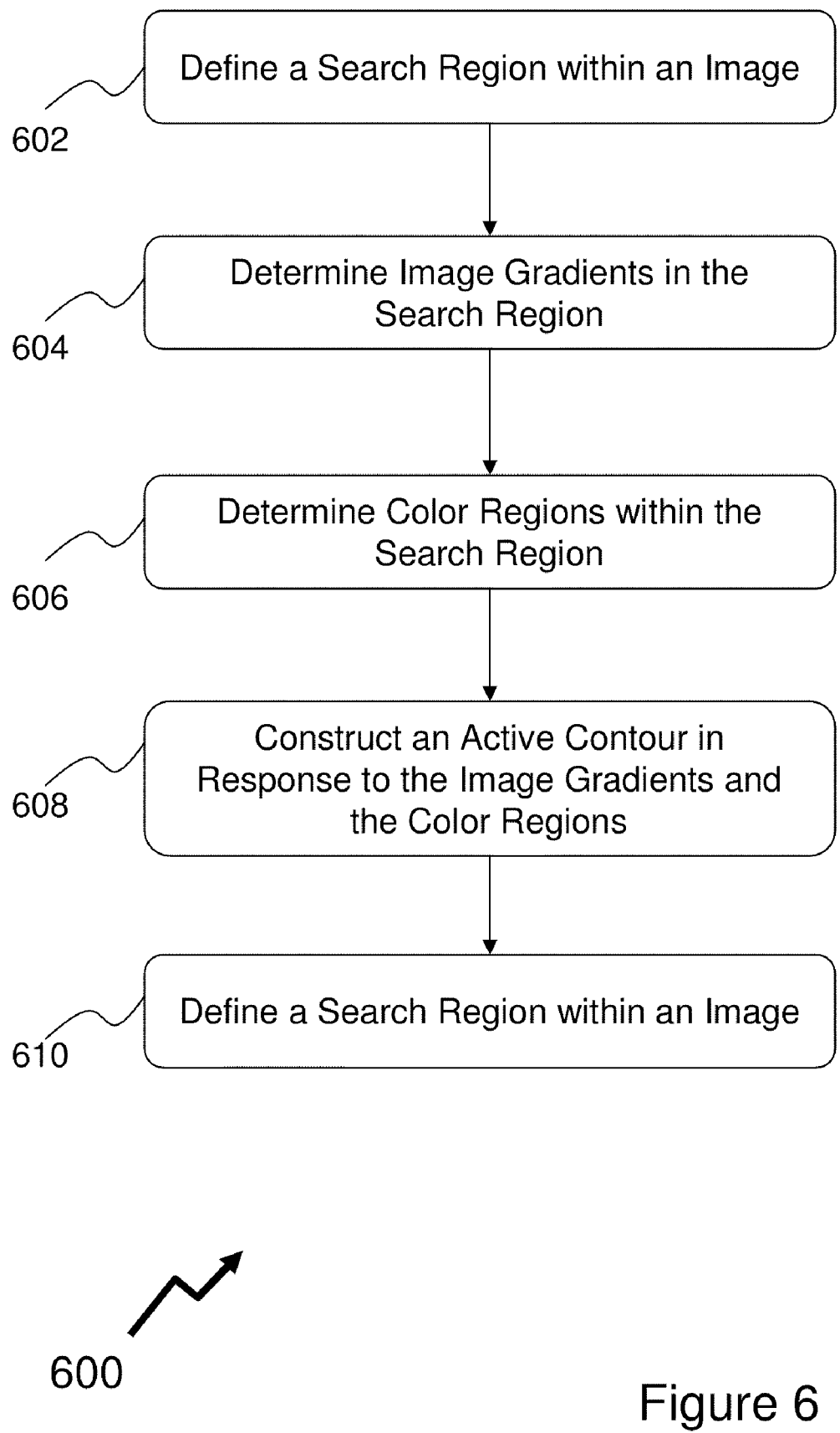
FIG. 6 is a flow diagram illustrating an embodiment of a procedure for processing image data.

FIG. 6 is a flow diagram illustrating an embodiment of a procedure 600 for processing image data. The procedure identified in FIG. 6 is a summary of the more detailed procedures, calculations, and methods discussed herein. Additionally, FIG. 6 represents one possible procedure for processing image data. Alternate embodiments may omit one or more steps shown in FIG. 6 and/or add one or more steps not shown in FIG. 6.

Initially, procedure 600 defines a search region within an image (block 602). This search region may be defined by a user or by another system or procedure. In a particular embodiment, the search region is determined automatically. The search region may be defined, at least in part, by one or more points identified by a user of another. Procedure 600 continues by determining image gradients in the search region (block 604). The procedure then determines color regions within the search region (block 606). Determining image gradients and/or color regions may include dividing the search region into multiple sub-regions. In one embodiment, the color regions are determined by Fisher linear discriminant analysis.

Procedure 600 continues by constructing an active contour (also referred to as a "snake") in response to the image gradients and the color regions (block 608). This active contour represents object boundaries in an image. Finally, the energy of the active contour is minimized to derive an optimal active contour.

Figure 7:
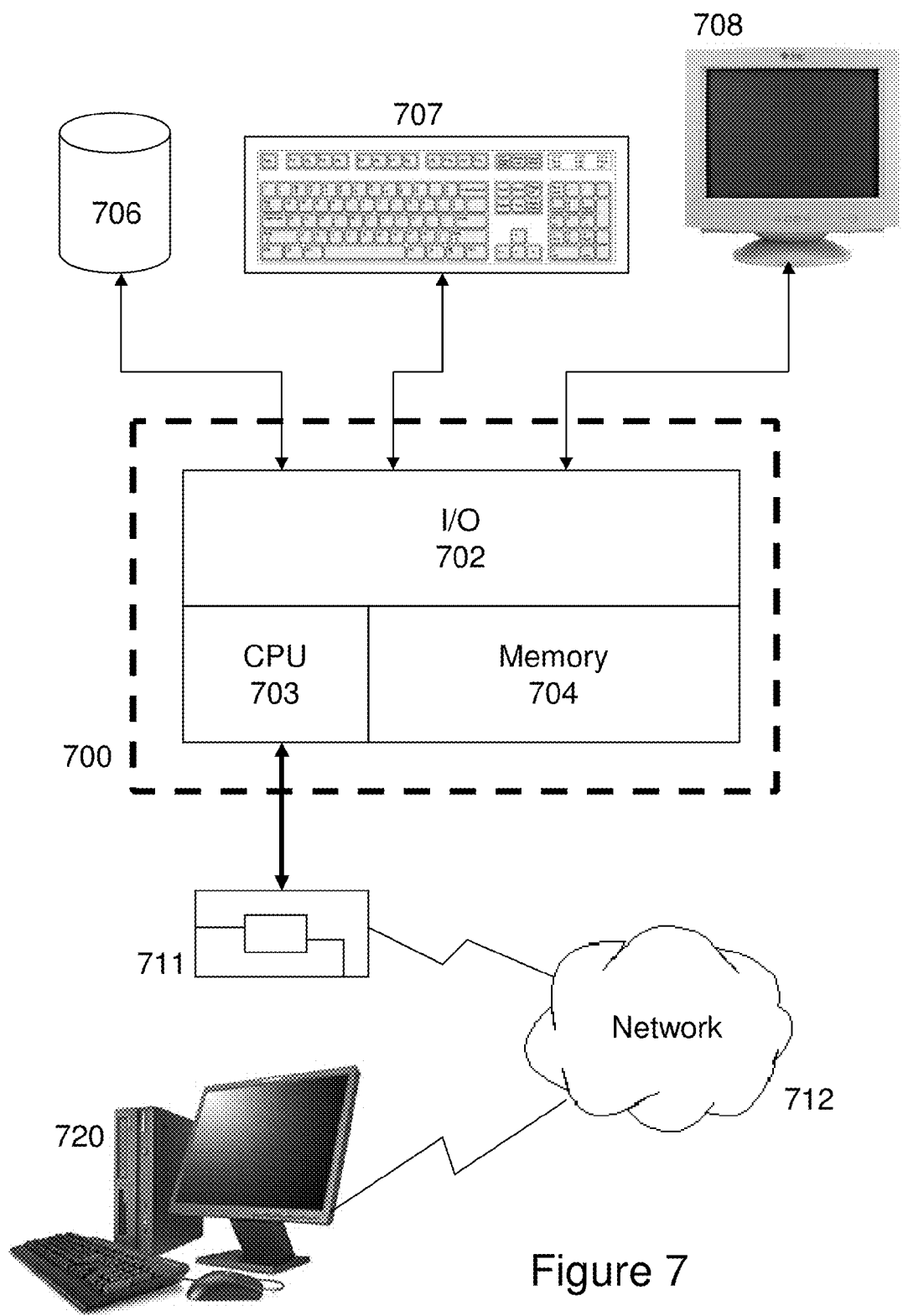
FIG. 7 illustrates an example of a computing system in which the various methods described herein may be implemented.

Shown below in FIG. 7 is one example of a computing system 700 in which the various methods described herein may be implemented. In its most basic configuration, the computing system 700 includes a processing unit 702; an input/output (I/O) section 702, and a main memory 704, including volatile and/or non-volatile memory. Additionally, the computing system may include or have access to various mass storage devices or systems 706, including various removable and/or non-removable mass storage devices. Examples of mass storage devices might be, without limitation, various magnetic, optical, and/or non-volatile semiconductor memory, etc. In the case where the mass storage device comprises a number of storage devices, those devices may be distributed, such as across a computer network.

The computing system 700 may have connected hereto input devices, such as a keyboard 707, a mouse (not shown), various optical scanners or readers, microphones, video cameras, or various other computer input devices. The computing system 700 may also have various output devices connected thereto, such as display devices 708, speakers, printers, or various other computer output devices. The various input and output devices may be connected to the computing system 700 via the I/O section 702.

Other aspects of the computing system 700 may include appropriate devices 711 to establish network or communications connections to other devices, computers, networks, servers, etc., using either wired or wireless computer-readable media, and using various communications protocols. For example, the computing system 700 is shown in FIG. 7 as being connected to a remote computing system 720.

The computing system 700 and the remote computing system 720 may be a part of, or in communication with, computer networks 712, such as Wide Area Networks (WAN), Local Area Network (LANs), the Internet, or any of various other computer networks.

Figure 8:
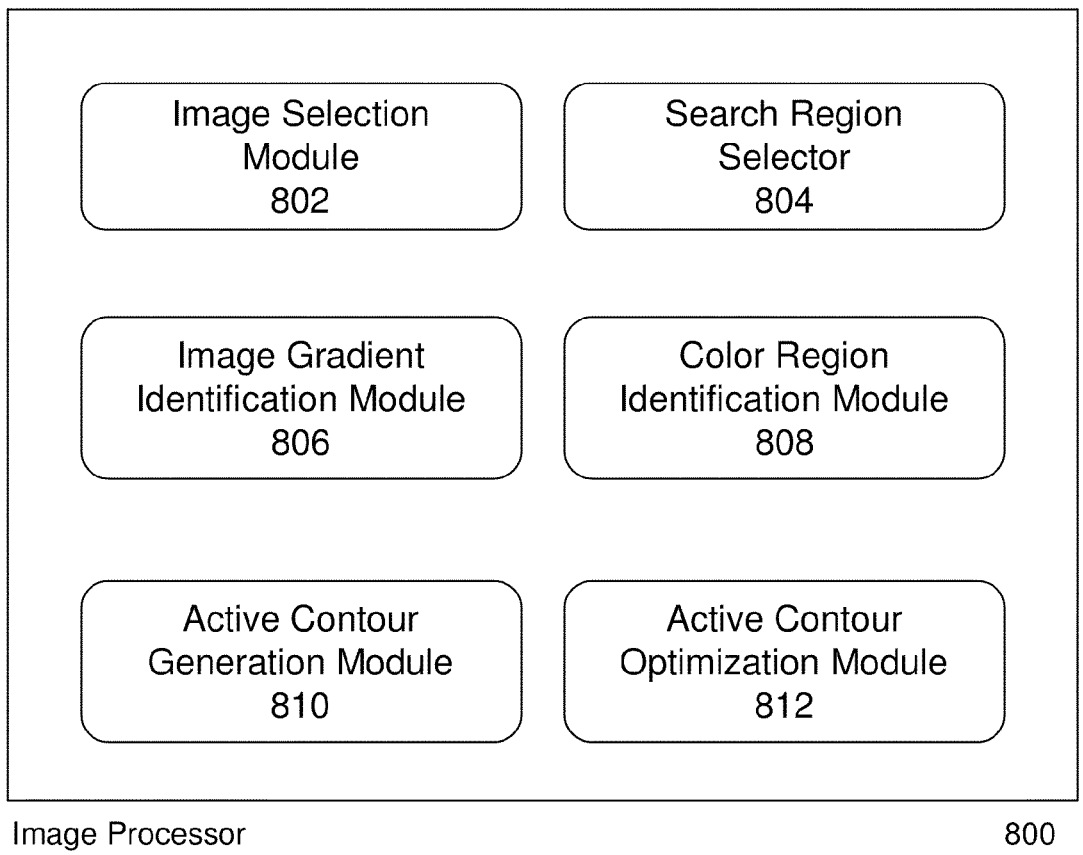
FIG. 8 illustrates an example image processor capable of implementing the various methods described herein.

FIG. 8 illustrates an example image processor 800 capable of implementing the various methods described herein. Image processor 800 may be a stand-alone device or may be incorporated into another device, such as an image capture device, a display device, or the like. In alternate embodiments, image processor 800 may include one or more additional components and/or may omit one or more of the components shown in FIG. 8.

Image processor 800 includes an image selection module 802 that, for example, allows a user to select among various images to process or display. Image processor 800 also includes a search region selector 804 to select and/or identify a search region within an image. This search region may be associated with a particular object in an image. An image gradient identification module 806 determines image gradients in the search region. A color region identification module 808 is capable of determining one or more color regions within the search region. An active contour generation module 810 constructs an active contour in response to the image gradients and the color regions discussed above. Finally, an active contour optimization module 812 minimizes the energy of the active contour.

Particular embodiments of image processor 800 may also include one or more interface components, storage components, processing components, communication components, and the like that are not shown in FIG. 8.

The various implementations set forth herein have been illustrated with respect to certain specific exemplary implementations. However, it should be understood that other related implementations are contemplated. For example, and without limitation, color region membership may be estimated by other means, such as using Bayesian statistics, or with other classifiers, such as those listed in T.-S. Lim, W.-Y. Loh and Y.-S. Shih, "A Comparison of Prediction Accuracy, Complexity, and Training Time of Thirty-three Old and New Classification Algorithms", Machine Learning Journal, v. 40, p. 203-229, 2000. Furthermore, additional information may be used as part of the edge analysis as well. For instance, in addition to edge strength or edge position the snake may weight the edge distance map by a measure of edge continuity.

Although various implementations set forth herein have been described in language specific to structural features and/or methodological steps, it is to be understood that the invention defined in the appended claims is not necessarily limited to the specific features or steps described. Rather, the specific features and steps are disclosed as representative forms of implementing the claimed invention.

What is claimed is:
1. A method comprising:
  (a) retrieving from a memory an image for graphic image processing on a system comprising the memory and a processor, the image comprising a plurality of pixels and an element to be processed;
  (b) establishing with the system a search region within the image encompassing a predetermined portion of the element to be processed and containing pixels on each side of a boundary between the element and the remainder of the image;
  (c) selecting a predetermined portion of the pixels within the search region to create an analysis group;
  (d) determining with the system a plurality of colour regions for the analysis group corresponding to a plurality of pixel classifications, wherein an error function represents a probability that each of the pixels within the analysis group belongs to one of the plurality of pixel classifications;
  (e) constructing with the system an edge map by establishing an initial boundary of the element; and
  (f) creating with the system a boundary contour in dependence upon establishing a target condition for an energy of an active contour, the energy of the active contour established in dependence upon at least the error function and the edge map.

2. The method according to claim 1 wherein,
step (b) comprises establishing a search region associated with an edge or boundary of the element in the image.

3. The method according to claim 1 wherein,
step (b) comprises establishing the search region in dependence upon at least one of applying a predetermined process to the pixels of the image, a user input, and applying a predetermined geometric shape to the image.

4. The method according to claim 1 wherein,
step (e) comprises establishing the initial boundary in dependence upon image gradients calculated from at least one of an error function relating to one of the plurality of pixel classifications and applying a predetermined process to the predetermined portion of the pixels within the search region.

5. The method according to claim 4 wherein,
calculating the image gradients is performed at a different scale to that of the source image by filtering the at least one of.

6. The method according to claim 1 wherein,
step (f) comprises establishing the target condition for the energy of the active contour by applying empirical weighting coefficients to each of the error function and the edge map.

7. The method according to claim 1 wherein,
step (b) further comprises rotating the search region to create a one-dimensional active contour at least one of initially or after step (e) has been executed to generate the initial boundary and steps (b) onwards are subsequently repeated.

8. A method comprising:
(a) retrieving from a memory an image for graphic image processing on a system comprising the memory and a processor, the image comprising a plurality of pixels and an element to be processed;
(b) establishing a first search region within the image encompassing a predetermined portion of the element to be processed and containing at least a pixel on each side of a boundary between the element and the remainder of the image;
(c) selecting with the system a first predetermined portion of the pixels within the first search region to create an analysis group;
(d) processing the analysis group to establish the boundary in dependence upon an initial boundary contour;
(e) repeating steps (b), (c) and (d) with the system wherein the first search region is replaced with a second search region that is defined at a different scale to the first search region, encompasses the boundary, and contains at least a pixel on each side of the boundary and the initial boundary contour is the established boundary.

9. The method according to claim 8 wherein,
step (d) comprises the steps of:
(1) selecting with the system a predetermined portion of the pixels within the first search region to create an analysis group;
(2) determining with the system a plurality of colour regions for the analysis group corresponding to a plurality of pixel classifications, wherein an error function represents a probability that each of the pixels within the analysis group belongs to one of the plurality of pixel classifications;
(3) constructing with the system an edge map in dependence upon the initial boundary contour; and
(4) establishing the boundary in dependence upon establishing a target condition for an energy of an active contour, the energy of the active contour established in dependence upon at least the error function and the edge map.

10. The method of claim 8 further comprising;
repeating the method defined by steps (b) through (e) until a predetermined condition is satisfied.

11. The method according to claim 8 wherein,
step (b) comprises at least one of establishing the search region to determine an edge of the element, applying a predetermined process to the pixels of the image, receiving user input, and using a predetermined geometric shape.

12. The method according to claim 8 wherein,
step (d) comprises establishing the initial boundary in dependence upon image gradients calculated from at least one of an error function relating to one of the plurality of pixel classifications and applying a predetermined process to the predetermined portion of the pixels within the search region.

13. The method according to claim 12 wherein,
calculating the image gradients is performed at a different scale to that of first search region.

14. The method according to claim 9 wherein,
step (4) comprises establishing the target condition for the energy of the active contour by applying empirical weighting coefficients to each of the error function and the edge map.

15. The method according to claim 8 wherein,
step (b) further comprises rotating the search region to create a one-dimensional active contour at least one of initially, after step (d) has been executed to generate the initial boundary, and during step (e) to provide the second search region.

16. A method comprising:
(a) retrieving from a memory an image for graphic image processing on a system comprising the memory and a processor, the image comprising a plurality of pixels and an element to be processed;
(b) establishing a first search region within the image encompassing a first predetermined portion of the element to be processed and containing at least a pixel on each side of a boundary between the element and the remainder of the image;
(c) establishing a second search region within the image;
(d) selecting with the system a first predetermined portion of the pixels within the first search region to create an analysis group;
(e) selecting with the system a second predetermined portion of the pixels within the second search region to create a training group;
(f) establishing a plurality of color regions corresponding to a plurality of pixel classifications in dependence upon the training group; and
(g) processing the analysis group to establish the boundary in dependence upon an initial boundary contour, the plurality of pixel classifications, and the analysis group.

17. The method according to claim 16 wherein,
step (g) comprises the steps of:
(1) determining with the system an error function representing a probability that each of the pixels within the analysis group belongs to one of the plurality of pixel classifications;
(2) constructing with the system an edge map by establishing an initial boundary of the element in dependence of the initial boundary contour; and
(3) establishing with the system a boundary contour in dependence upon establishing a target condition for an energy of an active contour, the energy of the active contour established in dependence upon at least the error function and the edge map.

18. The method according to claim 16 wherein,
step (b) comprises:
(4) selecting a third search region encompassing a second predetermined portion of the element; and
(5) dividing the third search region into a plurality of sub-divided regions, one of the plurality of sub-divided regions being the first search region and another of the plurality of sub-divided regions being an adjacent region to the first search region.

19. The method according to claim 16 wherein,
step (c) comprises:
(6) selecting a third predetermined portion of the pixels within the first search region that are adjacent a region boundary between the first search region and another region; and
(7) selecting a fourth predetermined portion of the pixels within the adjacent region adjacent the region boundary.

20. The method according to claim 16 further comprising;
(h) repeating steps (b) through (g) wherein,
the first search region is replaced with a fourth search region that is defined at a different scale to the first search region, encompasses a predetermined portion of the established boundary, and contains at least a pixel on each side of the established boundary; and
the initial boundary contour is the predetermined portion of the established boundary.

\* \* \* \* \*

UNITED STATES PATENT AND TRADEMARK OFFICE
CERTIFICATE OF CORRECTION

PATENT NO. : 8,144,980 B2
APPLICATION NO. : 12/942258
DATED : March 27, 2012
INVENTOR(S) : Trifonov et al.

Page 1 of 1

It is certified that error appears in the above-identified patent and that said Letters Patent is hereby corrected as shown below:

Title Page, Related U.S. Application Data:

insert

--(63) Continuation of application No. 10/886,937, filed on Jul. 18, 2004, now Pat. No. 7,840,074.

(60) Provisional application No. 60/454,653, filed on Feb. 17, 2004.--.

Signed and Sealed this
Seventh Day of August, 2012

David J. Kappos
*Director of the United States Patent and Trademark Office*